(12) United States Patent
Groendahl et al.

(10) Patent No.: US 8,298,469 B2
(45) Date of Patent: *Oct. 30, 2012

(54) METHOD FOR MANUFACTURING MAGNET POLES

(75) Inventors: Erik Groendahl, Them (DK); Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,437

(22) Filed: Feb. 7, 2012

(65) Prior Publication Data

US 2012/0141317 A1   Jun. 7, 2012

Related U.S. Application Data

(63) Continuation of application No. 12/218,709, filed on Jul. 17, 2008, now Pat. No. 8,153,047.

(30) Foreign Application Priority Data

Jul. 20, 2007   (EP) ..................... 07014331

(51) Int. Cl.
*H05B 6/00* (2006.01)
*B29C 71/04* (2006.01)
*H01F 3/08* (2006.01)
*H02K 15/12* (2006.01)

(52) U.S. Cl. ........ 264/428; 264/219; 264/259; 264/263; 264/272.15; 264/274; 264/427; 264/429; 29/608; 29/596; 29/736; 310/44; 310/156.11; 310/156.12; 310/156.13; 75/10.67; 249/117; 249/135; 148/301; 419/25; 419/29; 419/38; 335/302

(58) Field of Classification Search .......... 264/219, 264/259, 263, 272.15, 274, 427, 428, 429; 29/608, 596, 736; 310/44, 156.11, 156.12, 310/156.13; 75/10.67; 249/117, 135; 148/301; 419/25, 29, 38; 335/302

See application file for complete search history.

(56) References Cited

U.S. PATENT DOCUMENTS

| | | | | |
|---|---|---|---|---|
| 2,762,778 A | * | 9/1956 | Gorter et al. | 29/607 |
| 3,892,603 A | * | 7/1975 | Reid | 148/108 |
| 6,380,833 B1 | * | 4/2002 | Nguyen et al. | 335/301 |
| 7,366,454 B2 | * | 4/2008 | Nakamura et al. | 399/277 |
| 7,371,292 B2 | * | 5/2008 | Shimada et al. | 148/302 |
| 7,391,291 B2 | * | 6/2008 | Miyata | 335/302 |

(Continued)

FOREIGN PATENT DOCUMENTS

EP   899049 A1 * 3/1999
JP   2000282106 A * 10/2000

*Primary Examiner* — Christina Johnson
*Assistant Examiner* — Atul P Khare

(57) ABSTRACT

A method for manufacturing sintered magnet poles is described. The mold is filled with a vitrifiable base material powder and closed with a plate. A magnetic field aligns the powder and a plate pressed onto the powder establishes a compact that holds the alignment in place. The compact is sintered to form a sintered magnet pole. The mold forms a protective cover of the sintered magnet pole and the plate forms a base plate of a magnet pole piece. Furthermore, a magnet pole piece is provided which has a magnet pole and a base plate which is fixed to a protective cover so that the base plate and the protective cover surround the magnet pole. The base plate and/or the protective cover of the magnet pole piece has at least one element that provides a geometrical locking of the magnet pole to the base plate and/or the protective cover.

12 Claims, 2 Drawing Sheets

U.S. PATENT DOCUMENTS 7,836,575 B2 * 11/2010 Groendahl et al. ............. 29/596
7,985,363 B2 * 7/2011 Somple et al. ................ 264/263
7,988,795 B2 * 8/2011 Hirota et al. .................. 148/103
2007/0245851 A1 * 10/2007 Sagawa et al. ............... 75/10.67

* cited by examiner

METHOD FOR MANUFACTURING MAGNET POLES

CROSS REFERENCE TO RELATED APPLICATIONS

This application is a continuation of Ser. No. 12/218,709 filed Jul. 17, 2008 now U.S. Pat. No. 8,153,047, which claims priority of European Patent Office application No. 07014331.8 EP filed Jul. 20, 2007. All of the applications are incorporated by reference herein in their entirety.

FIELD OF INVENTION

The present invention relates to a method for manufacturing magnet poles.

BACKGROUND OF INVENTION

Permanent magnets are used to an increasing extent in large electrical machines, for instance in motors, generators and other such machines. This is due to the increased efficiency and robustness compared with electrical excitation. In particular, rare-earth magnets, primarily based on neodymium iron boron (abbreviated as NdFeB), have turned out to provide a very high energy product and are therefore very useful in compact machinery.

However, some problems in relation to the practical application remain unsolved. The best magnet materials corrode very easily, need a high degree of protection and are also rather brittle and cannot safely be fixed by bolting alone. Furthermore, the known manufacturing methods comprise a long series of steps, some of which are expensive and involve wastage of costly materials.

The traditional method of mounting permanent magnets on, for example, a large generator rotor comprises extensive surface protection on the individual magnets and gluing the magnets to the rotor rim. Furthermore, it is necessary to wrap the completed rotor with glued-on magnets with a fibreglass bandage.

This method contains several difficulties. The surface protection is extensive and due to new technologies it is not proven over a lifetime of, for example, 20 years. The magnets cannot be magnetised in situ. This means that all work is done with magnetised parts which require special tools and stringent control of the work to avoid hazardous situations. Once mounted on the motor and covered by a fibreglass bandage the magnets cannot be removed for re-magnetising in the case of an irreversible demagnetisation event.

SUMMARY OF INVENTION

In order to overcome these difficulties solutions have been developed whereby magnets are manufactured as complete pole pieces. In a pole piece one or more magnets are glued to a steel base plate and are covered with a protective cover. The protective cover is typically made of stainless steel. The manufacturing of such a pole piece requires the prior manufacturing of finished permanent magnets for subsequent completion as pole pieces.

One of the key processes for the manufacturing of neodymium iron boron based magnets is sintering. Sintered neodymium iron boron based magnets achieve their coercivity by virtue of a neodymium rich phase at grain boundaries which acts to produce liquid phase sintering, smooth the boundaries and hence prevent nucleation of reverse magnet domains.

The state of the art processing route for sintered neodymium iron boron based magnets starts with a cast ingot of rare earth neodymium material mixed with iron and boron in an $Nd_2Fe_{14}B$ composition. The as-cast ingot is first broken into a powder. This is achieved most conveniently by exposing the ingot to hydrogen which is absorbed at the surface and enters the material in the spaces between the atoms and causes the material to expand. The differential expansion generates stress in the ingot and the alloy breaks down into a fine powder. This process is known as Hydrogen Decrepitation (HD). The HD powder is then broken up further by a jet milling stage which reduces the particle size to around 5 mm. When the alloy is in powder form it is very flammable and must be handled under an inert gas.

When the powder has been broken down to such a fine size each particle of powder is a single crystal which can be aligned in a magnetic field. This alignment is held in place by pressing the powder into a green compact which is about 60% dense. The compact is then heated in a vacuum to about 1,060° C. for one hour. During the heating stage the hydrogen exits the material and is pumped away. When held at about 1,060° C. for one hour sintering occurs and the compact densifies with the assistance of the liquid formed by the melting of the neodymium rich phase. After sintering the magnets are quenched and then heat treated in order to achieve optimum magnetic properties.

The magnet must then be machined to the final dimensions required for the intended application. Due to the large degree of shrinkage that occurs during sintering, which is greater in the direction of alignment, it is not possible to press compacts that will shrink to the exact required size. The machining is a very expensive operation and, particularly for small magnets, a large proportion of the material may need to be machines away.

Due to the highly reactive nature of the neodymium rich phase, the magnets tend to corrode very rapidly, particularly in moist environments. Therefore, the next stage in the processing is to provide a protective barrier on the surface of the magnets. This is usually done with a nickel coating. It is also possible to use aluminium, zinc and epoxy resin as a coating.

In a next step the magnets are mounted in a pole piece. One or more magnets are glued to a steel base plate and are covered with a protective cover. The protective cover can be made of stainless steel, for example. In order to ensure that the magnets will not move inside the protective cover, in case the glue joint with the base plate gives way, the inside of the protective cover is filled with a filling material, for example, epoxy resin or silicon rubber. Provided that the cover does not allow the diffusion of water vapour and the filling material surrounds the magnets completely, a high-degree corrosion protection of the magnets is not required.

This method more or less eliminates the difficulties of traditional magnet mounting. Expensive surface protection is not required, the magnets can be magnetised after mounting in the pole pieces and the pole pieces can be removed for re-magnetising in case of an irreversible demagnetisation event. Some practical difficulties remain, however. Firstly, the process has many steps, some of which are expensive and involve the removal of expensive magnet material by grinding. Secondly, the long process involves numerous steps that are critical for the quality of the finished product, for example gluing and other steps. Thirdly, the fixing of the protective cover can be difficult without damaging the filling material.

It is therefore an objective of the present invention to provide an advantageous method for manufacturing a permanent magnet pole. Further, it is an objective to provide an advantageous magnet pole piece.

This objective is solved by a method for manufacturing magnet poles as claimed in an independent claim and a magnet pole piece as claimed in an further independent claim. The depending claims define further developments of the invention.

The inventive method for manufacturing sintered magnet poles comprises the following steps: a vitrifiable base material powder is filled into a mould that ultimately forms a protective cover of the finished magnet pole. The mould is closed with a cap, which is implemented as a plate and which ultimately forms a base plate of a magnet pole piece. The mould with the powder is placed in a magnetic field for aligning the powder. The cap or plate is pressed such onto the powder as to establish a compact that holds the alignment in place. In a last step the compact is sintered so as to form a sintered magnet pole.

The inventive method allows the sintering of the magnet in situ directly in a component that can subsequently form the mounting base and protective cover of the finished magnet pole. The inventive manufacturing method has several advantages compared to other known methods. Firstly, several steps of the known methods for the manufacturing of magnet poles are eliminated. Especially the magnet requires no expensive machining and there is no separate gluing process. Furthermore, no expensive magnet material is removed by grinding. Moreover, no corrosion protection of the magnet is required since it can basically be totally enclosed before being exposed to any humidity.

The sintering may be performed by heating in vacuum. By heating the mould with the compact in vacuum any included hydrogen is escaping from the compact during the sintering of the compact. The sintered magnet pole can be quenched. Moreover, the sintered magnet pole can be heat treated in order to achieve optimum magnetic properties.

A suitable vitrifiable base material for sintering may be neodymium iron boron based powder. Such a powder can be provided by conventional steps including casting, decrepitation and milling, resulting in the neodymium iron boron based powder suitable for sintering.

The mould can be fixed to the plate before or after quenching or heat treatment, especially to ensure corrosion protection of the magnetic material. For example, the mould may be fixed to the plate by welding or soldering. It is advantageous if the mould ultimately forms a protective cover of the sintered magnet pole. Furthermore, the plate ultimately forms a base plate of a magnet pole piece. Alternatively, it may also form the base plate of the finished magnet pole.

Moreover, a filling material can be introduced between the magnet pole and the mould. The filling material may be introduced after fixing the mould to the plate by vacuum injection. As filling material for example epoxy resin or silicon rubber can be used. The filling material provides an additional protection of the magnet pole.

Generally, the mould can be manufactured of magnetic or non-magnetic material. It can especially be manufactured of stainless steel or any other suitable preferably non-magnetic material. However, the mould may also be made of a magnetic material, provided the wall thickness is only a small fraction of the magnet pole width.

The mould may be in its final shape before the sintering of the compact. Alternatively, it may be only in a rough shape. It is then pressed into a die during the sintering of the compact to acquire its final shape. Furthermore, the cap or plate can be machined to its final thickness before the sintering or it can be machined after sintering or after heat treatment, especially to ensure proper flatness and other dimensional tolerances.

Preferably the protective cover and/or the base plate are fitted with suitable holes, grooves and/or protrusions that engage the magnet powder, and subsequently the finished sintered material, in order to establish a geometrical locking of the finished magnet to the protective cover and/or the base plate.

The inventive method may be used for manufacturing magnet poles which may be used for an electrical machine. The electrical machine may be, for example, a generator or a motor. The inventive method is preferably used for manufacturing magnet poles for wind turbine generators, especially large wind turbine generators.

The inventive magnet pole piece comprises a magnet pole and a base plate which is fixed to a protective cover so that the base plate and the protective cover surround the magnet pole. It is characterised in that the base plate and/or the protective cover comprises at least one element that provides a geometrical locking of the magnet pole to the base plate and/or the protective cover. The element may be a hole, a groove or a protrusion. The magnet pole can additionally be fixed to the base plate, for instance by gluing.

It is advantageous if the protective cover is equipped with at least one protrusion on each side which fixes the magnet pole to a particular position inside the protective cover. In this case it is especially possible to renounce gluing the magnet pole to the base plate. This simplifies the demounting of the magnet pole, for example for re-magnetising in case of an irreversible demagnetisation event.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
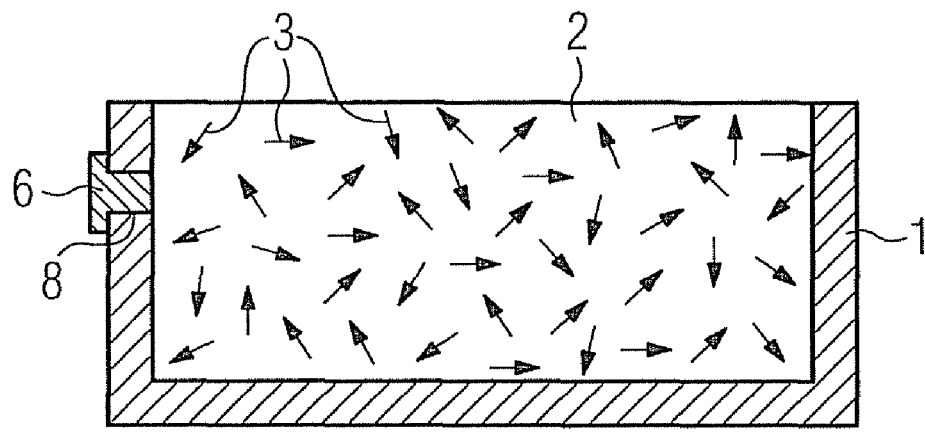
FIG. 1 schematically shows a mould filled with neodymium iron boron based powder in a sectional view.

A first embodiment of the present invention will now be described with reference to FIGS. 1 to 4. At first the inventive method for manufacturing sintered magnet poles requires a suitable base material for sintering. This base material, for example, may be neodymium iron boron based powder 2 suitable for sintering, i.e. vitrifiable neodymium iron boron based powder. It can, for example, be provided by conventional steps including casting, decrepitation and milling as it has been described in the introductory part of this specification. The powder 2 is filled into a mould 1 that will, in the present embodiment, ultimately form the protective cover. This is schematically shown in FIG. 1, which shows the mould 1 which is completely filled with the neodymium iron boron based powder 2. The base powder 2 comprises single crystal powder particles with randomly orientated magnetic dipoles 3. The random orientation of the magnetic dipoles of the powder is indicated by arrows 3. The mould 1 comprises an opening 8 which is closed with a valve 6.

Figure 2:
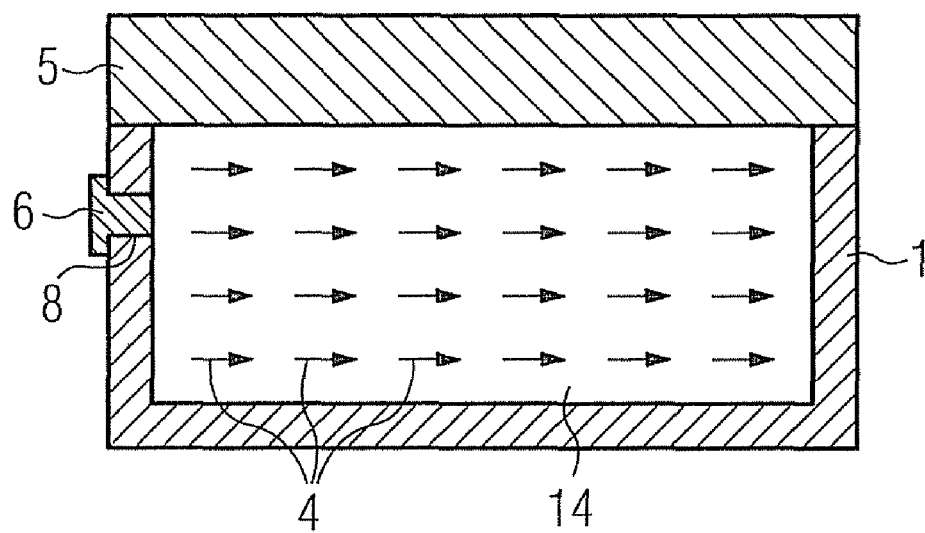
FIG. 2 schematically shows the mould of FIG. 1 after magnetic alignment of the powder and covering it with a base plate in a sectional view.

In a next step the mould 1 is closed with a cap in the form of a plate 5 that will, in the present embodiment, ultimately form the base plate of the finished magnet pole. Then the mould 1 with its powder fill 2 is placed in a magnetic field for the alignment magnetic dipoles of the powder particles. Preferably the plate 5 is firmly pressed onto the powder fill 2 to establish a compact 14 that holds the alignment in place. The result is schematically shown in FIG. 2 where the mould 1 which is closed with the plate 5 and filled with the compact 14 made of the pressed and aligned neodymium iron boron based powder 2 is shown in a sectional view. The aligned magnetic dipoles of the compact 14 are indicated by arrows 4. One can see in FIG. 2 the mould 1, which is also shown in FIG. 1, equipped with an opening 8. The opening 8 is still closed with a valve 6.

The mould 1 and/or the plate 5 can be made of stainless steel, for example. The mould 1 with the compact 14 is heated in a vacuum to eliminate any hydrogen remaining from an HD process and sintering of the compact 14 to form the sintered magnet pole 7. After sintering, the resulting magnet pole is optionally quenched and then heat treated in order to achieve optimum magnetic properties.

Figure 3:
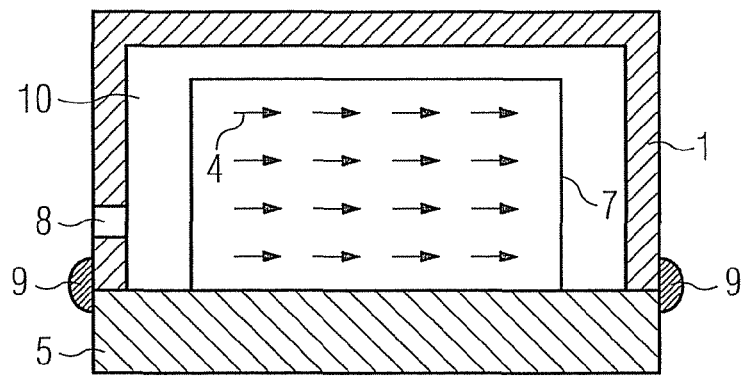
FIG. 3 schematically shows a magnetic pole piece after sintering in a sectional view.

During the sintering process the former neodymium iron boron based powder compact shrinks and forms the magnet pole 7. One can see in FIG. 3, which schematically shows the magnet pole 7 obtained after sintering the compact 14, that the shrinkage is greater in the direction of the alignment of the magnetic dipoles 4. Due to the shrinkage a hollow space 10 occurs between the magnet pole 7 and the protective cover 1. Compared to FIG. 2, the magnet pole 7 in FIG. 3 is turned so that the plate 5 is now on the bottom side. The magnet pole 7 in FIG. 3 is fixed to the plate 5 caused by the sintering process. Moreover, the magnet pole 7 comprises aligned magnetic dipoles 4.

After quenching and heat treatment the mould 1 is welded to the plate 5. The plate 5 then forms the base plate of the magnet pole 7 to which the mould 1 as a protective cover is fixed. FIG. 3 shows a weld seam 9 by which the mould 1 is welded to the plate 5. The weld seam 9 is located at the connection between the mould 1 and the plate 5. Alternatively, the protective cover may be fixed to the base plate 5 before quenching and heat treatment. Instead of welding, soldering or any other suitable method for fixing the protection cover to the base plate may also be applied.

Figure 4:
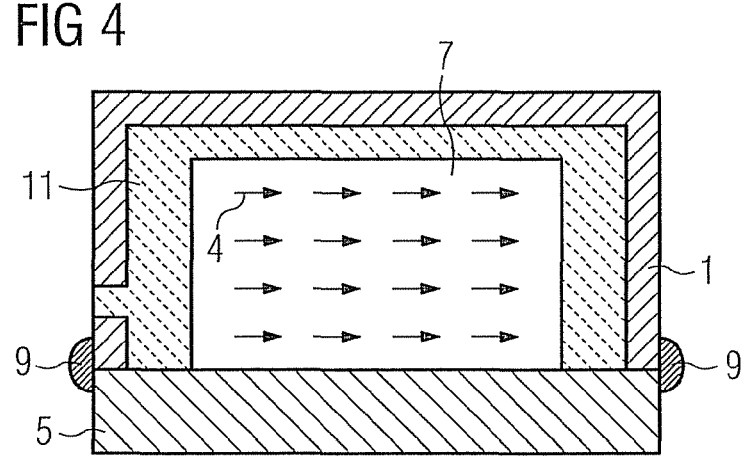
FIG. 4 schematically shows the magnetic pole piece of FIG. 3 which is additionally equipped with a filling material in a sectional view.

The opening 8 in the protective cover 1, which is shown in FIG. 3, makes it possible to evacuate the hollow space 10 and to fill it with a suitable filling material 11. FIG. 4 schematically shows a magnet pole piece in which the hollow space 10 is filled with a filling material 11 in a sectional view. Epoxy resin or silicon rubber may be used as a filling material 11, for example. After filling the hollow space 10 with the filling material 11 it is possible to close the opening 8 again with the valve 7. Alternatively, the opening 8 may be closed by means of a filling material 11, as shown in FIG. 4.

Figure 5:
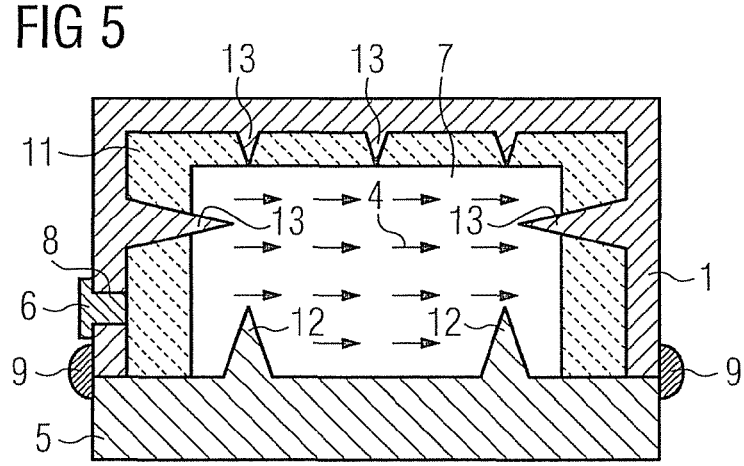
FIG. 5 schematically shows an alternative magnetic pole piece in a sectional view.

A second embodiment of the invention will now be described with respect to FIG. 5. Elements of the present embodiment which correspond to elements of the first embodiment are designated with the same reference numerals and will not be described again to avoid repetition.

Regarding the individual steps of the applied inventive method it is referred to the first embodiment. FIG. 5 schematically shows an alternative finished magnetic pole piece in a sectional view. One can see in FIG. 5 a base plate 5 to which a magnet pole 7 is fixed. The magnet pole 7 comprises aligned magnetic dipoles 4. Further, a protective cover 1, which may have been used as mould during the manufacturing process as described in the first embodiment, is welded to the base plate 5 so that the magnet pole 7 is surrounded by the base plate 5 and the protective cover 1. Instead of welding also soldering or any other suitable method for fixing the protective cover to the base plate can be applied.

In this embodiment a mould that ultimately forms the protective cover 1 is used which comprises protrusions 13 at its inner surface. The base plate 5 is also equipped with protrusions 12 on the surface which is in contact with the neodymium iron boron based powder inside the protective cover 1. The protrusions 12, 13 provide a geometrical locking of the finished magnet pole 7 to the protective cover 1 and to the base plate 5.

Instead of protrusions 12, 13 the protective cover 1 and/or the base plate 5 may be equipped with holes, grooves or other suitable means that engage the magnet powder 2 and subsequently the finished sintered magnet pole 7 in order to establish a geometrical locking of the finished magnet pole 7 to the protective cover 1 and/or the base plate 5.

The magnet pole 7 is fixed to the base plate 5 inside the protective cover 1 by means of protrusions 12 of the base plate 5 and caused by the sintering process. The space between the protective cover 1 and the magnet pole 7, which is caused by shrinking of the magnet pole 7 during the sintering process, is filled with a filling material 11. The filling material 11 may be, for instance, silicon rubber or epoxy resin. The protective cover 1 comprises a hole 8 through which the filling material 11 is injected into the space between the protective cover 1 and the magnet pole 7. After injecting the filling material 11 the opening 8 is closed by means of a valve 6.

It is alternatively also possible that the protective cover 1 in both embodiments may only be in a rough shape and acquires its final shape by grinding at the end or by pressing it into a suitable die during the sintering process. Moreover, the base plate 5 may be machined to its final thickness before sintering or it may be finished after sintering to ensure proper flatness and other dimensioned tolerances following heat treatment.

In summary, the invention discloses a method for manufacturing permanent magnet pole pieces which simplifies the manufacturing process and eliminates several costly steps. The invention further provides an advantageous magnet pole piece.

The invention claimed is:

1. A method for manufacturing sintered magnet poles, comprising:
   providing a mould having a first opening;
   filling a vitrifiable randomly oriented base material powder into the mould through the first opening;
   closing the first opening with a plate;
   placing the mould with the randomly oriented powder into a magnetic field to align the randomly oriented powder into aligned powder;
   pressing the plate onto the aligned powder to establish a compact that holds the alignment of the aligned powder in place;
   sintering the compact while the compact is oriented over the plate inside the mould to form a sintered magnet pole that adheres to the plate as a result of the sintering process, wherein a gap is formed between the sintered magnet pole and the mould due to shrinkage of the compact during sintering;
   simultaneously pressing the mould inside a die during sintering, wherein the mould is initially provided in a rough shape, and wherein the rough shape is converted to a final shape as a result of said pressing;
   quenching and then heat treating the sintered magnet pole;

fixing the mould to the plate before or after quenching or heat treatment;

introducing a filling material into the gap by vacuum injection after fixing the mould to the plate; and using the protective cover and base plate as part of the final product, wherein the mould ultimately forms a protective cover of the sintered magnet pole and the plate ultimately forms a base plate of a magnet pole piece.

2. The method as claimed in claim 1,
wherein the sintering is performed by heating in vacuum.

3. The method as claimed in claim 1,
wherein the randomly oriented vitrifiable base material powder is a neodymium iron boron based powder.

4. The method as claimed in claim 2,
wherein the randomly oriented vitrifiable base material powder is a neodymium iron boron based powder.

5. The method as claimed in claim 1, wherein the mould is fixed to the plate by welding or soldering.

6. The method as claimed in claim 1, comprising:
machining the plate to its final thickness before or after sintering or after heat treating the magnet pole.

7. The method as claimed in claim 1, comprising:
fixing the magnet pole to the plate.

8. The method as claimed in claim 7,
wherein the magnet pole is fixed to the plate with glue.

9. The method as claimed in claim 1, comprising:
securing the magnet pole in position with at least one element of the base plate or the protective cover that provides a geometrical locking of the magnet pole to the base plate or the protective cover.

10. The magnet pole piece as claimed in claim 9, wherein the element is a hole, a groove, or a protrusion, and wherein the magnet pole is secured to the base plate.

11. The method as claimed in claim 1,
wherein the mould includes a second opening which is closed during the filling, the closing, the placing, the pressing, and the sintering.

12. The method as claimed in claim 1, comprising:
opening the second opening after the sintering; and
introducing the filling material into the gap via the second opening.

* * * * *